Patented May 1, 1934

1,957,298

UNITED STATES PATENT OFFICE

1,957,298

METHOD OF TREATING SCORCHED RUBBER COMPOUNDS AND PRODUCT PRODUCED THEREBY

Morris G. Shepard and Edward R. Burns, Waterbury, Conn., assignors, by mesne assignments, to Dispersions Process, Inc., New York, N. Y., a corporation of Delaware No Drawing. Application June 27, 1931, Serial No. 547,458

8 Claims. (Cl. 134—17)

This invention relates to methods of treating scorched or prematurely vulcanized rubber compounds and products produced thereby. The invention relates especially to the treating of rubber compounds that have been scorched during such operations as milling, calendering, etc. or that have been scorched during storage subsequent to such operations as milling, calendering, etc. in order to render such waste materials capable of further processing.

Premature vulcanization or scorching during process has become more frequent with the addition of ultra rapid accelerators. To reduce the scorching hazards, softening agents, separation of curing ingredients, and cooling methods have been developed. Prematurely vulcanized or scorched stocks have been salvaged by the usual alkali or acid digestion processes or other so-called devulcanization methods of the reclaiming industry. When prevulcanized stocks are salvaged by these methods commonly used with ordinary reclaim, the prices paid for such scrap are necessarily low and the rubber reclaimed by the processes is of inferior quality as compared with original rubber compounds.

The present invention relates to methods whereby scorched rubber stocks may be reclaimed in such a manner that the resulting products may be used in the same processes as similar products made from unscorched rubber compositions.

We reclaim a prematurely cured or scorched rubber stock by breaking down the stock with the gradual addition of water in small amounts as by milling the stock on a tightly closed mill. By adding water slowly on a tightly closed mill the frictional rubbing action of the rolls on thin films of rubber is increased by virtue of the accompanying cooling of the rubber and the preventing of softening through heat plasticizing. When prematurely cured or scorched rubber is milled it sheets out in a creepy or crumbly condition and the addition of water together with the intimate frictional rubbing of the tight rolls on the thin films of rubber as described produces a gradual change in the appearance of the scorched rubber which on continued milling results in a smooth plastic film. In general the addition of about 10% of water is sufficient for the smoothing of the scorched stock when broken down on tightly closed rolls. The addition of 10% of water in this operation may leave about 2⅓ water in the final product. The scorched stock that has been thus "brought back" so as to mill smoothly may not in this condition be used in the usual calendering operations as would an ordinary unscorched rubber compound. The presence of water in a rubber compound during subsequent processing and completed vulcanization would tend to cause blistering and to retard the rate of cure. If desired small amounts of this "brought back" stock may be mixed with fresh stocks of the same composition but as a rule the use of over 5% of this "recovered" or "brought back" material would be considered hazardous. In order to produce a product that can be completely utilized by itself, we disperse the "brought back" stock in water, thus producing a dispersion of the rubber compound in water which may be used as natural or artificial rubber latices are used today. This scorched rubber which has been rendered uniformly plastic and homogneous in the presence of water may be subsequently dispersed in water by any of the well known methods of dispersing rubber compositions. One well known method is by the gradual addition of small amounts of water to the rubber material and hydrophilic colloid in an internal mixer until a change in phase results wherein the rubber changes from the continuous into the discontinuous phase. The hydrophilic colloid used to effect this change of phase may be of protein origin, for example, soluble alkaline caseinates, gelatin, glue and the like; alakali salts of the higher fatty acids, for example, sodium, potassium, or ammonium soaps of oleic, stearic, palmitic, rosin, (abietic), acids and the like; mixtures of soaps and proteins; or colloidal clays, such as bentonites, Wilkinite and the like.

Without intention of limiting the invention thereby the following example of the method of reclaiming the prematurely vulcanized stock is included: Smoked sheet in the rubber compound below was broken down on a hot mill before mixing in the compounding ingredients. The finished batch which contained

| | Parts |
|---|---|
| Smoked sheet | 45.00 |
| Tuads | 0.11 |
| Zinc oxide | 2.25 |
| Sulphur | .45 | was rolled up on leaving the mill and stored. In less than 24 hours the stock was set up and had become "bin scorched". The following day the above prematurely vulcanized rubber compound was reclaimed or "brought back" to a plastic condition on a tightly closed mill through the gradual addition of water, the total amount of water added being about 10% of the weight of the batch. The rubber compound after its treatment contained approximately 2⅓% of water. To accomplish this result, 2000 gram portions of the above scorched compound were placed on a tightly closed 24 inch mill and 200 grams of water were added gradually in 10 gram portions during a period of 20 minutes. The rate of the water addition was controlled so as to prevent the rubber compound from breaking apart and leaving the rolls. Another portion of the same scorched compound was reclaimed by the above method even after storing for several days instead of for 24 hours as in the above example.

Six days after the above compound had been reclaimed or recovered as described above, the material was substituted for crude rubber in a regular dispersion compound, and it was dispersed as below. The usual dispersion composition in which it was desired to substitute scorched stock for raw rubber was as follows:

| | Parts |
|---|---|
| Smoked sheet | 45.00 |
| Zinc oxide | 40.00 |
| Tuads | .11 |
| Sulphur | 3.02 |
| Agerite white | .44 |
| Tackol | 1.30 |
| Bentonite clay | 7.80 |

In order to obtain a dispersion of a similar composition but using the scorched stock, the following additional compounding ingredients were required to complete the rubber compound:

| | Parts |
|---|---|
| Zinc oxide | 37.75 |
| Sulphur | 2.57 |
| Agerite white | .44 |
| Tackol | 1.30 |
| Bentonite clay | 7.8 |

To the scorched rubber that had been "brought back" to a plastic condition through the addition of water on a tight mill until it contained approximately 2⅓% of water were added the above compounding ingredients with the exception of the sulphur and Bentonite clay. These compounding ingredients were added to the "brought back" stock on the mill after the stock had been warmed up. The milled batch weighed 873 grams and was then placed in a warm internal two-bladed mixer of the Werner and Pfleiderer type of two quart capacity. After the charge was pulling uniformly, water was added in separate "shots" or portions of 30 grams, each addition being made after the disappearance of the water from the previous "shot". The 78 grams of dry Bentonite clay needed to make up the composition were added after the fourth "shot" of water had been taken up by the charge. When the clay had been uniformly distributed throughout the rubber mass, cooling water was turned on in the jacket of the mixer while further additions of the water were continued by the "shot" method until a total of eleven "shots" of 30 grams each of water had been absorbed by the charge. At this point 25.7 grams of finely divided sulphur were added followed in turn by the twelfth "shot" of water. The cooling water was then turned off in the jacket of the mixer and the steam turned on gradually until an inversion of phase had resulted. The rubber compound changed from a continuous pulling charge to a discontinuous or dispersed phase while the water in turn became the continuous phase. The dispersed charge was then diluted by the gradual addition of warm water by the "shot" method to a total solids concentration of 40%.

The above dispersion compared very favorably with a dispersion of a similar stock in which the rubber had not been prematurely vulcanized.

The above method of dispersing the "brought back" scorched stock is only an example of one of a number of possible methods of dispersing the rubber stock. Any of the well known methods of producing dispersions from crude or scrap products may be used. The above prematurely vulcanized rubber was "brought back" on a mill with tightly closed rolls, such as the so-called "leaf sheeter" used in the reclaiming industry. In the process of "bringing back" the scorched stock, water may be added to the stock on an ordinary cold or warm mill, providing the rolls are set tight and the temperature of the rolls is not sufficiently high to remove water too rapidly, cold conditions giving the most effective action. This operation cannot successfully be performed on an ordinary cold or warm mill with open rolls due to insufficient rubbing action as well as the danger of breaking the equipment due to the strength of pre-vulcanized or scorched stocks. The use of an internal mixer such as a Werner and Pfleiderer or Banbury is open to the same objections and also to the additional objection that such a mixer does not give true breakdown but rather a heat plasticizing effect on the rubber. Compounding ingredients may be added to the "brought back" stock before dispersing as desired. As various other modifications will occur to those skilled in the art, it is not intended to limit the invention other than as set forth in the appended claims.

Having thus described our invention, what we claim and desire to protect by Letters Patent is:

1. A method of treating scorched rubber stock comprising milling scorched rubber stock on tightly closed rolls while gradually adding water thereto until the rubber assumes a smooth plastic condition, and dispersing the thus treated rubber in an aqueous medium.

2. A method of treating scorched rubber stock comprising milling scorched rubber stock on tightly closed rolls while gradually adding water thereto until the rubber assumes a smooth plastic condition, transferring the thus treated rubber to an internal mixer and dispersing the thus treated rubber therein.

3. A method of treating scorched rubber stock comprising milling scorched rubber stock on tightly closed rolls while gradually adding water thereto until the rubber assumes a smooth plastic condition, adding compounding ingredients to the plastic mass, transferring the thus treated rubber to an internal mixer and dispersing the thus treated rubber therein.

4. A method of treating scorched rubber stock comprising milling scorched rubber stock on tightly closed rolls while gradually adding water thereto until the rubber assumes a smooth plastic condition, adding compounding ingredients to the plastic mass, transferring the thus treated rubber to an internal mixer, and adding a dispersing agent and water to the mixer to form a dispersion of the thus treated rubber.

5. A composition of matter comprising a dispersion of scorched rubber in an aqueous medium.

6. A composition of matter comprising a dispersion of scorched rubber in an aqueous medium, said dispersion containing a colloidal dispersing agent.

7. A composition of matter comprising a dispersion of scorched rubber in an aqueous medium, said dispersion containing colloidal clay.

8. A method of utilizing scorched rubber stock in place of raw rubber which consists in masticating the scorched stock on tightly closed mill rolls, cooling the stock and increasing the frictional action of the rolls on the stock by adding small amounts of water at intervals, continuing the mastication and addition of water until a plastic mass results, and dispersing the plasticized stock in an aqueous medium.

MORRIS G. SHEPARD.
EDWARD R. BURNS.